July 15, 1969     R. I. GODFREY     3,455,624
SELF-CLEANING VEHICLE MIRROR
Filed Nov. 8, 1966
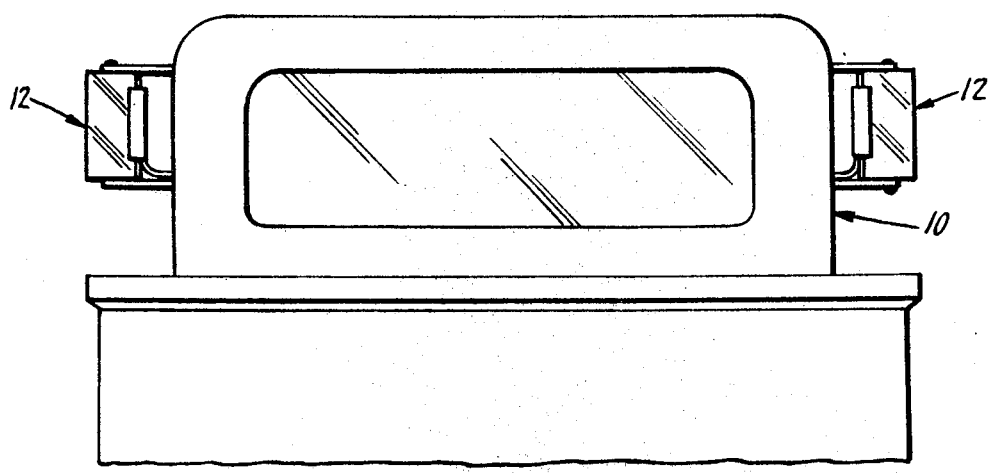
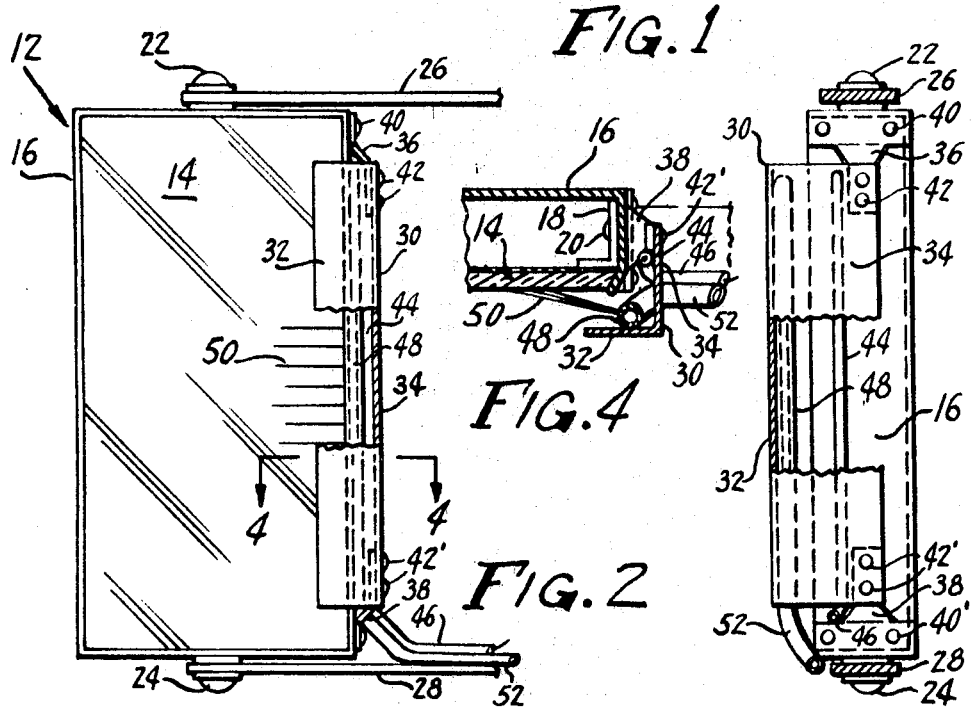
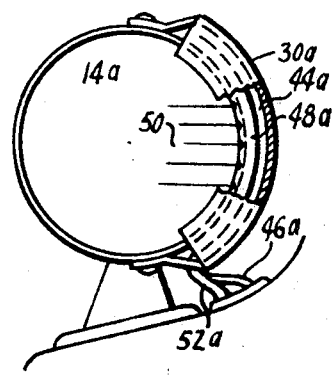
INVENTOR.
RAYMOND I. GODFREY
BY *Kimmel, Crowell & Weaver*
ATTORNEYS.

United States Patent Office 3,455,624
Patented July 15, 1969

3,455,624
SELF-CLEANING VEHICLE MIRROR
Raymond I. Godfrey, 2357 Lansing Way,
Sacramento, Calif. 95825
Filed Nov. 8, 1966, Ser. No. 592,883
Int. Cl. G02b 7/18, 5/08
U.S. Cl. 350—63                                    3 Claims

ABSTRACT OF THE DISCLOSURE

An outside rear-view mirror having an air deflector mounted thereon for collecting air and directing it across the reflective surface of the mirror with a heating element being secured to the deflector to heat the current of air and a spray manifold being mounted in spaced relation to the reflective member on the air deflector and arranged to spray a cleaning liquid into the current of air and onto the reflective surface.

---

This invention relates to automobile or vehicle mirrors and more particularly to vehicle rear-view mirrors having means for maintaining the reflective surface in clean condition.

The object of this invention is the provision of a rear-view mirror for use on vehicles having means for deflecting a stream of air across a reflective surface therein to maintain the reflective surface in a clean condition.

A further object of this invention is the provision of a rear-view mirror having means associated therewith for projecting a stream of heated air across a reflective surface.

Yet an additional object of this invention is the provision of a rear-view mirror having means for directing a plurality of liquid jets at a reflective surface to clean the reflective surface.

Yet an additional object of this invention is the provision of a rear-view mirror having in combination an air deflecting means, means for heating air prior to deflecting it across a reflective surface and means for directing a plurality of liquid jets at the reflective surface.

The provision of the specific structures as shown in the drawings is an additional object of this invention.

Other objects of the invention will become apparent to those skilled in the art from the specification which follows and from the drawings to which reference is now made.

In the drawings:

FIGURE 1 is a view from the rear of a vehicle, such as a pickup, provided with a pair of the mirrors of this invention;

FIGURE 2 is a view from the rear of the mirror of this invention showing the vertical layout of the components thereof, showing a partial cutaway section of the deflector;

FIGURE 3 is a side elevational view of the mirror of this invention taken substantially at right angles to the view of FIGURE 2;

FIGURE 4 is a top cross-sectional view in enlarged dimension showing the position of the reflective surface, the deflector, the heater and the water spray manifold; and FIGURE 5 is a view of the construction of this invention as applied to a circular mirror.

Vehicles, such as pickup 10, are commonly provided with externally mounted rear-view mirrors because rear-view mirrors mounted inside the vehicle are usually inadequate for many purposes. The field of vision is generally limited by the mounting of the mirror inside the vehicle and, in industrial vehicles, the rear window is frequently covered by an obstruction. It is common then, to provide externally mounted rear-view mirrors such as 12 on one or both sides of the vehicle to permit the driver to view the traffic conditions, loading ramps, and the like from inside the vehicle.

Such externally mounted mirrors generally give a quite adequate view of the rear of the vehicle and the terrain behind the vehicle, but in inclement weather, such as in rain or snow, the view frequently becomes obstructed by the adherence of moisture particles to the mirror. In addition, on cold days, frost tends to collect on mirrors and limit or obscure the vision of the driver. Where rear-view mirrors are mounted on the outside of the vehicle and where the mirrors are of any substantial size, there is a tendency for dust and dirt to collect on the mirror as a result of the vacuum created behind the mirror as the vehicle moves forward. Thus, particularly in damp weather, a layer of mud or road film will collect on the mirror which limits the vision of the driver.

The mirror of this invention is designed to obviate the above problems by providing means for cleaning the mirror and maintaining the reflective surface thereof in a clean condition. To this end, the mirror 12 which may comprise a reflective member or surface 14 which is mounted in a frame 16 and may be secured therein by a keeper 18, as best shown in FIGURE 4, which is, in turn, secured in place by rivets 20. Mounting means such as bolts 22 and 24 and mounting arms 26 and 28 are provided for securing the mirror to the vehicle.

An important feature of the invention is the provision of a deflector 30 along at least part of one side of the mirror to direct a stream of air across the reflective surface. Deflector 30 comprises a deflecting wall portion 32 which is positioned to deflect a stream of air from one side of the mirror across reflective surface 14 and with an inner collector wall 34 which extends rearwardly to a point behind the reflective member for collecting air from the backside of the mirror or reflective member. The air is collected by wall 34 and deflected by portion 32 to direct a stream of air across the reflective surface 14 thereby preventing the collection of dust, falling droplets of moisture, and other objects or materials which would tend to obscure the driver's vision. By directing a stream of air across the mirror the vacuum created by the movement of the mirror through the air is no longer effective to deposit dirt and road film on the mirror.

The deflector 30 may be mounted along one edge of the mirror by brackets 36 and 38 which are held in position by rivets 40 and which are connected to the deflector by rivets 42 or by any conventional or convenient mounting means.

Another highly important feature of this invention is the provision of a heater 44 which extends along one side of the mirror. The heater is preferably an elongate heating member which is shaped generally to conform to the peripheral edge of the reflective surface. As the air is forced through the deflector by wall 34 it passes the heater 44 where it is warmed before it is deflected across the mirror by portion 32. The heater may be of the type sold under a trade name such as Chromalux or Heatube. Of course, any conventional elongate heater which can be shaped to conform to the peripheral dimensions of the mirror may be used. The heater is connected by conductor 46 to the battery of the vehicle through such switches as may be desirable.

Another important feature of the invention is the provision of a spray manifold 48 which has a plurality of jets therein for directing liquid streams, generally indicated at 50, toward the reflective surface 14. The spray manifold 48, like the heater, should preferably be an elongate member which may be shaped to conform to the peripheral edge configuration of the reflective surface. A tube 52 is provided in communication with spray manifold 48 and which may be connected to the conventional windshield spray system of vehicles for supplying a stream of cleaning liquid, such as water, water containing detergent, or water containing detergent and anti-freeze toward the mirror. Thus, on cold days, a stream of liquid having a low freezing point may be directed at the mirror to remove the frost therefrom. The mirror may then be dried by heating a stream of air prior to deflecting the stream across the reflective surface. Thus, it will be apparent that the combination of the deflector, the heater, and the spray manifold along at least one side of a reflective surface prevents the accumulation of dirt on the mirror, permits the washing of the mirror and drying of the mirror all while the vehicle is moving.

The invention as described may be applied to mirrors of any shape, for example, to circular mirrors such as is shown in FIGURE 5. The circular mirror of FIGURE 5 may comprise a circular reflective surface 14a, an arcuate deflector 30a, an arcuately shaped heater 44a mounted between the reflective surface 14a and the deflector 30a and an arcuately shaped spray manifold 48a which is also mounted between the reflective surface 14a and the deflector 30a. A conductor 46a and a conduit 52a may be provided as previously described. Of course, if elongate heater elements and spray manifolds are selected which may be shaped, and the deflector is properly shaped, the mirror of this invention may be of any desired shape or size.

While this invention has been described with reference to particular constructions and shown in its most preferred embodiment, it will be realized that changes from the structures actually illustrated will become obvious in light of the teachings of the specification to those skilled in the art and such changes may be made without departing from the spirit of the invention. The scope of the invention is intended to be limited only by the appended claims and not by the drawings or specific embodiments herein, which are intended merely as exemplary.

I claim:
1. A readily mountable outside rear-view mirror unit for automobile vehicles comprising
   a reflective member having a reflective surface,
   a frame encompassing said reflective member,
   means mounting said frame to an automobile vehicle,
   a separate air deflector extending partially along a side of the reflective member with said deflector including a collector wall arranged in equispaced relation to one side edge of said reflective member and having its entire inner and outer surfaces extending perpendicularly to the reflective surface of said reflective member and terminating slightly forwardly of said reflective member,
   a deflector wall integrally formed with said collector wall and extending perpendicularly thereto inwardly towards said reflective member and spaced rearwardly therefrom, said air deflector being adapted upon forward movement of the vehicle to direct a current of air across the reflective surface of said reflective member,
   means securing said air deflector to said frame,
   an elongated heating element mounted on said air deflector between said collector wall and said reflective member for heating the current of air prior to directing it across said reflective surface,
   a spray manifold mounted on said air deflector in spaced relation to said reflective member and having a plurality of spray jets opening toward said reflective surface, and
   means for supplying a cleaning liquid to said manifold for spraying into the current of air onto said reflective surface.

2. A device as claimed in claim 1 in which said reflective member is rectangular and said air deflector extending parallel to one side edge thereof.

3. A device as claimed in claim 1 in which said reflective member is circular and said air deflector is semicircular and is arranged concentric to the circular edge of said reflective member.

References Cited
UNITED STATES PATENTS

| | | | |
|---|---|---|---|
| 2,622,261 | 12/1952 | Smith | 350—63 X |
| 2,796,506 | 6/1957 | Lumbert | 350—63 X |

FOREIGN PATENTS

| | | |
|---|---|---|
| 1,020,576 | 2/1966 | Great Britain. |

DAVID SCHONBERG, Primary Examiner

PAUL R. GILLIAM, Assistant Examiner